3,165,489
ADHESIVES FROM COPOLYMERS OF ETHYLENE AND N-VINYL-N-METHYL-ACETAMIDE

Clarence E. Roth, Jr., Charleston, W. Va., assignor to Union Carbide Corporation, a corporation of New York
No Drawing. Filed Mar. 6, 1963, Ser. No. 263,106
10 Claims. (Cl. 260—31.2)

This invention relates to novel room-temperature adhesives. More particularly, this invention relates to normally liquid solutions of certain copolymers of ethylene and N-methyl-N-vinyl acetamide which are useful as room-temperature adhesives for flexible or rigid, porous or non-porous substrates.

The presently known room-temperature adhesives, except for the recently-available two-component epoxide resin systems, are generally solutions of natural or synthetic resins in a fast-drying solvent. These adhesives are of two general types: (a) adhesives which set up hard on drying and (b) adhesives which remain flexible on drying.

The adhesives which set up hard on drying, such as solutions of cellulose nitrate or poly(vinyl acetate), although useful for the bonding of porous, rigid substrates, cannot be employed in instances where a flexible bond is desired, for example, in bonding flexible foam rubber, soft leather, cloth or paper. In addition, when adhesives of this type are employed in bonding non-porous substrates, poor bonds are obtained because, except at the edges of the bond in contact with the air, the solvent cannot evaporate to permit the adhesive to harden and form a secure bond.

The flexible adhesives or "contact" cements, such as solutions of natural or synthetic rubbers, are very useful in the areas where the "hard setting" adhesives are not; i.e., they can be employed in the bonding of flexible or non-porous substrates. In this type of adhesive, the solution is generally applied to the surfaces of the substrates to be bonded, the solvent is evaporated to form a tacky coating on each substrate and the coated substrates are then brought in contact with each other to form the bond. However, this type of adhesive is not satisfactory for bonding porous, non-flexible subtrates, particularly when the bond is subject to sheer, because the bond is generally much weaker than the bond provided by the "hard-setting" adhesives previously described.

Thus, it can be seen that, prior to this invention there has not been available a room-temperature adhesive suitable for bonding both flexible and non-flexible substrates, or both porous and non-porous substrates. Although it has been found that various copolymers of ethylene with other olefinically-unsaturated comonomers, such as vinyl acetate or ethyl acrylate, will form bonds to a wide variety of substrates, polymers of this type are generally of the "hot-melt" type. That is, a film of the polymer, or an admixture of the polymer with another material, usually a paraffin wax, is placed between the substrates to be bonded and the resulting "sandwich" is subjected to heat and pressure whereby the polymer is partially melted and, after cooling, solidifies to form the bond. Although solutions of these polymers can also be employed, the copolymers, particularly those having high ethylene contents, e.g., 50 percent or more polymerized ethylene, are generally insoluble in solvents at a temperature of about 70° C. or less, and cannot be dissolved in the fast-drying solvents normally employed in room-temperature adhesives. Thus, prior to this invention, only high boiling solvents, such as toluene, xylene and the like, could be employed and the bonding had to be conducted at elevated temperatures.

It has now been unexpectedly and surprisingly found that certain copolymers of ethylene and N-methyl-N-vinyl acetamide are soluble in fast evaporating solvents at room temperatures, and that solutions of these copolymers can be employed to bond rigid or flexible, porous or non-porous substrates at room temperature to form bonds having good strength. Thus, by this invention, there is available for the first time a truly all-purpose, one-component, room-temperature adhesive.

The copolymers which are employed in the adhesive compositions of this invention are copolymers containing from about 25 to about 50 weight percent, preferably from about 35 to about 45 weight percent polymerized N-methyl-N-vinyl acetamide, the balance of the copolymer being polymerized ethylene. These copolymers can have melt indexes of from about 10 to about 500 decigrams per minute, as determined according to ASTM D-1238-52T, with melt indexes of from about 50 to about 300 decigrams per minute being preferred.

These polymers are produced by any technique known to the art. One such technique comprises a free-radical catalyzed copolymerization of ethylene and N-methyl-N-vinyl acetamide, employing oxygen; peroxide catalysts, such as benzoyl peroxide, tert-butyl hydroperoxide and the like; azo-catalysts, such as azo-bis-isobutyronitrile and the like; or "redox" catalyst systems, such as tert.-butyl peroxide and sulfur dioxide. In general, the polymerization is conducted at pressures of from about 1000 to about 50,000 p.s.i.g. and temperatures of from about 0° C. to about 350° C. Solvents or diluents for the monomers or polymer can be employed if desired. The copolymer is recovered from the reaction by methods known to those skilled in the art.

The solvents which are employed in producing the adhesive compositions of this invention are acyclic ketones and esters having normal boiling points of from about 75° C. to about 130° C., with those having normal boiling points of from about 75° C. to about 105° C. being preferred. As examples of suitable ketones one can mention methyl ethyl ketone, methyl n-propyl ketone, methyl isopropyl ketone, methyl n-butyl ketone, methyl isobutyl ketone, methyl tert.-butyl ketone, methyl sec.-butyl ketone, diethyl ketone, di-n-propyl ketone, diisopropyl ketone and the like, with methyl ethyl ketone, methyl isobutyl ketone, methyl n-butyl ketone and diethyl ketone being preferred. Suitable esters include ethyl acetate, isopropyl acetate, n-propyl acetate, tert.-butyl acetate, sec.-butyl acetae, isobutyl acetate, n-butyl acetate, methyl proprionate, ethyl propionate, isopropyl propionate, n-propyl propionate, methyl valerate, methyl 2-methylpropionate, ethyl butyrate, ethyl 2-methylpropionate, isopropyl butyrate, isopropyl 2-methylpropionate, methyl 3-methylbutyrate and the like, with ethyl acetate, isopropyl acetate, n-propyl acetate, tert.-butyl acetate, methyl propionate, ethyl propionate, methyl butyrate and methyl 2-methylpropionate being preferred.

The normally liquid adhesive compositions of this invention generally have viscosities of from about that of the solvent up to about 10,000 centistokes or higher at room temperature. The low viscosity solutions are suitable for use as primers for various materials. Solutions having viscosities of about 10,000 centistokes are very thick and find utility as pastes and the like. The most useful solutions for general home use are those having viscosities in the range of from about 10 to about 1000 centistokes.

The concentration of polymer in the solution necessary to achieve a desired viscosity will depend upon the composition of the particular copolymer employed and the particular solvent employed, and can vary from about 1 to about 40 weight percent copolymer in the solution. In general, compositions suitable for use as primers normally contain from about 1 to about 5 weight percent copolymer in the solution. Solutions containing from about 10 to about 25 weight percent dissolved polymer are suitable for use as general household cements. Pastes normally contain from about 30 to 40 weight percent dissolved copolymer.

The adhesive solution can be applied to the substrate to be bonded in any manner known to those skilled in the art. Where at least one substrate is porous, it is preferred to spread a layer of the adhesive on each substrate and then bring the coated substrates in contact. The solvent will evaporate through the porous substrate. However, bonds are achieved more quickly by allowing a short air dry prior to bringing the coated substrates in contact. Where both substrates are non-porous the adhesive of this invention can be applied in the manner of a "contact adhesive," wherein both surfaces of the substrates are coated and most of the solvent is permitted to evaporate to form a tacky coating on each substrate. The coated surfaces are then contacted under slight pressure to form the bond.

The following examples are illustrative of the wide utility of the compositions of this invention as room-temperature adhesives.

EXAMPLE 1

Ethylene was admixed with N-methyl-N-vinyl acetamide. To this mixture were added 100 parts per million, based on the total comonomer weight, of oxygen. The resulting mixture was fed continuously at a pressure of greater than 20,000 p.s.i.g. to a stirred reactor having a jacket temperature of about 200° C. The polymer which was recovered contained 42 weight percent polymerized N-methyl-N-vinyl acetamide and had a melt index of 273 dgm./min. as determined by ASTM D–1238–52T.

A 4-ounce, round, wide-mouth bottle was charged with 20 milliliters of methyl ethyl ketone and 5 grams of the above ethylene/N-methyl-N-vinyl acetamide copolymer. The bottle was sealed and rolled for 65 hours to obtain a high viscosity (about 120 centistokes) solution containing 23.7 weight percent solids.

One surface of each of two 1-inch by 6-inch by 1-mil aluminum foil strips were coated with the solution and allowed to air dry for 10 minutes. The coated surfaces were then placed in contact with hand pressure and permitted to stand overnight. One end of the resulting "sandwich" was peeled back about 1 inch, the resulting tabs were placed in the jaws of an Instron testing machine, and the adhesive bond was pulled apart at a crosshead speed of 10 inches per minute to determine the peel strength of the bond. The test was repeated employing sandwiches produced from two strips of 5-mil aluminum foil and two strips of regenerated cellulose. The force in grams required for the delamination of each of these sandwiches is reported in Table I, below, together with values obtained from equivalent tests employing a commercially available cellulose nitrate "hard setting" adhesive for purposes of comparison.

Table I
PEEL STRENGTH, GRAMS

| Substrate | Ethylene N-Methyl-N-Vinyl Acetamide Copolymer | Cellulose Nitrate |
|---|---|---|
| Aluminum Foil: | | |
| 1-mil | 200 | 80 |
| 5-mils | 475 | 150 |
| Cellophane | 500 | 160 |

From Table I, it is readily apparent that the composition of this invention provides stronger bonds to non-porous, flexible substrates than do the "hard-setting" adhesives as represented by cellulose nitrate.

EXAMPLE 2

Employing a portion of the adhesive composition produced in Example 1, the surface of each of two 1-inch by 3-inch glass slides was coated and allowed to air dry for about 10 minutes. The coated surfaces were then contacted under hand pressure to form a lap joint having a bond area of about 1 inch by 1 inch. After drying overnight, the bond strength was tested by attempting to pull the slides apart manually. An excellent bond was obtained; the glass slides broke before delamination could occur. A similar laminate, produced employing a commercially-available cellulose nitrate adhesive, formed a poorer bond, with delamination occurring at the cellulose nitrate-glass interface. Thus, the adhesive of this invention forms a stronger bond to non-porous, rigid substrates than does a commercial "hard-setting" adhesive.

EXAMPLE 3

A portion of the adhesive composition produced in Example 1 was coated on each of two ¾-inch by 6-inch maple tongue depressors. The coated surfaces were placed in contact to form a ¾-inch by 2-inch bond and allowed to dry overnight. The wood strips broke when attempting to separate them by hand, leaving the bond intact, indicating that an excellent bond was achieved. In a similar test, employing a cellulose nitrate adhesive, a poorer bond was obtained, as indicated by delamination along the adhesive-wood interface. This example indicates that bonds obtained by the adhesives of this invention to porous, rigid substrates are stronger than those obtained with the conventional "hard-setting" adhesives.

EXAMPLE 4

A portion of the adhesive composition produced in Example 1 was coated on one surface of each of two 2-inch by 2-inch pieces of 30-pound kraft paper. The coated surfaces were placed in contact and allowed to dry overnight. An excellent bond was obtained, as indicated by tearing of the paper rather than delamination on attempting to separate the paper substrates by hand. A bond of similar strength was obtained employing the cellulose nitrate adhesive; however, the resulting laminate was brittle and not flexible, as was the laminate produced employing the ethylene/N - methyl - N - vinyl acetamide solution.

EXAMPLE 5

A quart can was charged with 75 grams of the ethylene/N-methyl-N-vinyl acetamide copolymer produced as described in Example 1 and 425 milliliters of methyl ethyl ketone. The can was sealed and rolled for 65 hours. An additional 250 milliliters of methyl ethyl ketone were added, and the resulting mixture was rolled for three days to form a solution containing 12.1 weight percent solids and having a viscosity of about 17 centistokes. Employing this solution several different substrates were bonded together and dried overnight. The resulting laminates were then pulled apart by hand and rated as follows:

A. Excellent; one substrate broke before delamination occurred.
B. Good; delamination occurred with difficulty but at the adhesive-substrate interface.

The results of these tests are set forth in Table II.

*Table II*

| Sandwich | | Rating |
|---|---|---|
| Substrate | Substrate | |
| Polyethylene | Polyethylene | B |
| Do | Phenolic | B |
| Phenolic | do | A |
| Foam rubber | Steel | A |
| Steel | do | B |
| Cork | Cork | A |
| Hard rubber | Hard rubber | B |
| Polyurethane foam | Polyurethane foam | A |
| Do | Regenerated cellulose | A |
| Do | Aluminum foil | A |
| Do | Ethylene glycol terephtahlic acid polyester film. | A |

EXAMPLE 6

Employing apparatus similar to that described in Example 5, 15 grams of the ethylene/N-methyl-N-vinyl acetamide copolymer produced in Example 1 were dissolved in 485 grams of methyl ethyl ketone, to form an adhesive solution containing 3.7 weight percent total solids and having a viscosity of about 8 centistokes. Employing this solution, one surface of each of (a) a 12-inch by 60-inch sheet of 1-mil aluminum foil, (b) a 12-inch by 60-inch sheet of regenerated cellulose, (c) a 12-inch by 60-inch sheet of a commercially available polyester resin of ethylene glycol and terephthalic acid, and (d) a 12-inch by 60-inch sheet of 30-pound kraft paper was coated, and dried for three days. To the coated surface of each of these substrates was applied a 1.5-mil film of molten polyethylene, at a web temperature of 295° C. The strength of each bond was tested by measuring the peel strength of the bond in the manner described in Example 1. The results of these tests, together with equivalent tests conducted employing laminates produced by bonding the molten polyethylene directly to the substrate, are set forth in Table III.

*Table III*

| Substrate | Peel strength, gm. | |
|---|---|---|
| | With adhesive | Without adhesive |
| Aluminum foil | 175 | 33 |
| Regenerated cellulose | 160 | 14 |
| Polyester film | 74 | 4 |
| Paper | A | B |

Because of the poor tensile strength of the paper, the peel strength of the bond has little meaning. However, the bonds were rated qualitatively as follows:

A. Excellent bond: No delamination occurred; rather, the paper tore.
B. Poor bond: The polyethylene readily separated from the paper with only a few fibers of the paper tearing indicating they had been incorporated in the molten polyethylene but that a uniform bond had not been obtained.

This example demonstrates that the adhesive compositions of this invention can be employed as primers for the production of laminates at elevated temperatures.

EXAMPLE 7

A 1-gallon can was charged with 1600 milliliters of methyl ethyl ketone and 400 grams of an ethylene/N-methyl-N-vinyl acetamide copolymer containing 38 weight percent polymerized N-methyl-N-vinyl acetamide and having a melt index of 80 dgm./min. After stirring for three hours, a very viscous solution was obtained. A portion of this solution was diluted with additional methyl ethyl ketone to provide a solution containing 18 weight percent solids which had a viscosity of about 53 centistokes.

Employing portions of this solution the surfaces of each of four ¾-inch by 6-inch maple tongue depressors were coated with the solution. Each of two of the coated sticks were contacted with hand pressure to form a lap measuring ¾ in. by 2⅔ inches and then air-dried overnight. The shear strengths of these bonds were then measured in an Instron tester, employing cross-head speeds of 0.2 inch per minute to simulate slow, steady pulling and 20 inches per minute to simulate a fast jerk. The results of these tests are set forth in Table IV, below, together with equivalent tests employing as adhesives two commercially available "hard-setting" adhesives, cellulose nitrate and poly(vinyl acetate), and one commercially-available rubber "contact" cement for purposes of comparison.

*Table IV*

| Adhesive | Shear Strength, lb. | |
|---|---|---|
| | 0.2 in./min. | 20 in./mins. |
| Ethylene/N-methyl-N-vinyl acetamide copolymer | 210 | 480 |
| "Hard-setting" adhesive: | | |
| Cellulose nitrate | >700 | >600 |
| Poly(vinyl acetate) | >785 | 650 |
| "Contact" cement | 60 | 70 |

From Table IV it can be seen that the shear strength of the adhesive compositions of this invention to porous, rigid substrates are intermediate those of the "hard-setting" adhesives and the "contact" adhesives.

From the foregoing examples it can be seen that the adhesive compositions of this invention can be employed to bond a wide variety of substrates, whether flexible or rigid, porous or non-porous, at normal atmospheric conditions. The peel strengths of these bonds are generally greater than the peel strengths achieved employing the commercially available "hard-setting" adhesives, and the shear strengths are intermediate those of the "hard-setting" adhesives and the "contact" cements. Thus, it is clar that, by this invention, there is provided for the first time a one-component, all purpose, room-temperature adhesive.

EXAMPLE 8

In a manner similar to that described in Example 1, 2 grams of a copolymer of ethylene and N-methyl-N-vinyl acetamide, said copolymer containing 40 weight percent polymerized N-methyl-N-vinyl acetamide and having a melt index of 148 dgm./min., were dissolved at room temperature in 20 milliliters of ethyl acetate to produce an adhesive composition suitable for bonding wood, paper, aluminum foil, rubber, glass and the like.

The copolymers employed in producing the solutions of this invention are disclosed and claimed in U.S. application Serial No. 129,573, filed on August 7, 1961, by J. W. Lynn. The use of ethylene/N-methyl-N-vinylacetamide copolymers as the adhesive interlayer in laminates is disclosed and claimed in U.S. application Serial No. 203,478, filed on June 17, 1962, by B. O. Baum et al.

What is claimed is:

1. A normally liquid solution of (1) a copolymer of ethylene and N-methyl-N-vinyl acetamide, said copolymer having a melt index of from 10 to 500 decigrams per minute and containing from 25 to 50 weight percent polymerized N-methyl-N-vinyl acetamide, the balance being polymerized ethylene, in (2) a solvent selected from the group consisting of acyclic esters and ketones having a boiling point of from 75° C. to 130° C., said solution having a viscosity at room temperature of up to 10,000 centistokes.

2. A normally liquid solution of (1) a copolymer of ethylene and N-methyl-N-vinyl acetamide, said copolymer having a melt index of from 10 to 500 decigrams per minute and containing from 25 to 50 weight percent polymerized N-methyl-N-vinyl acetamide, the balance being polymerized ethylene, in (2) an acylic ester having a boiling point of from 75° C. to 130° C., said solution having a viscosity at room temperature of up to 10,000 centistokes.

3. A normally liquid solution of (1) a copolymer of ethylene and N-methyl-N-vinyl acetamide, said copolymer having a melt index of from 10 to 500 decigrams per minute and containing from 25 to 50 weight percent polymerized N-methyl-N-vinyl acetamide, the balance being polymerized ethylene, in (2) an acyclic ketone having a boiling point of from 75° C. to 130° C., said solution having a viscosity at room temperature of up to 10,000 centistokes.

4. A normally liquid solution of (1) a copolymer of ethylene and N-methyl-N-vinyl acetamide, said copolymer having a melt index of from 10 to 500 decigrams per minute and containing from 25 to 50 weight percent polymerized N-methyl-N-vinyl acetamide, the balance being polymerized ethylene, in (2) methyl ethyl ketone, said solution having a viscosity at room temperature of up to 10,000 centistokes.

5. A normally liquid solution of (1) a copolymer of ethylene and N-methyl-N-vinyl acetamide, said copolymer having a melt index of from 50 to 300 decigrams per minute and containing from 35 to 45 weight percent polymerized N-methyl-N-vinyl acetamide, the balance being polymerized ethylene, in (2) a solvent selected from the group consisting of acyclic esters and ketones having a boiling point of from 75° to 105° C., said solution having a viscosity at room temperature of from 10 to 1,000 centistokes.

6. A normally liquid solution of a (1) copolymer of ethylene and N-methyl-N-vinyl acetamide, said copolymer having a melt index of from 50 to 300 decigrams per minute and containing from 35 to 45 weight percent polymerized N-methyl-N-vinyl acetamide, the balance being polymerized ethylene, in (2) an acyclic ester having a boiling point of from 75° C. to 105° C., said solution having a viscosity at room temperature of from 10 to 1,000 centistokes.

7. A normally liquid solution of a (1) copolymer of ethylene and N-methyl-N-vinyl acetamide, said copolymer having a melt index of from 50 to 300 decigrams per minute and containing from 35 to 45 weight percent polymerized N-methyl-N-vinyl acetamide, the balance being polymerized ethylene, in (2) an acyclic ketone having a boiling point of from 75° C. to 105° C., said solution having a viscosity at room temperature of from 10 to 1,000 centistokes.

8. A normally liquid solution of (1) a copolymer of ethylene and N-methyl-N-vinyl acetamide, said copolymer having a melt index of from 50 to 300 decigrams per minute and containing from 35 to 45 weight percent polymerized N-methyl-N-vinyl acetamide, the balance being polymerized ethylene, in (2) methyl ethyl ketone, said solution having a viscosity at room temperature of from 10 to 1,000 centistokes.

9. A normally liquid solution of (1) a copolymer of ethylene and N-methyl-N-vinyl acetamide, said copolymer having a melt index of from 10 to 500 decigrams per minute and containing from 25 to 50 weight percent polymerized N-methyl-N-vinyl acetamide, the balance being polymerized ethylene, in (2) ethyl acetate, said solution having a viscosity at room temperature of up to 10,000 centistokes.

10. A normally liquid solution of (1) a copolymer of ethylene and N-methyl-N-vinyl acetamide, said copolymer having a melt index of from 50 to 300 decigrams per minute and containing from 35 to 45 weight percent polymerized N-methyl-N-vinyl acetamide, the balance being polymerized ethylene, in (2) ethyl acetate, said solution having a viscosity at room temperature of from 10 to 1,000 centistokes.

References Cited in the file of this patent
UNITED STATES PATENTS

| | | |
|---|---|---|
| 2,231,905 | Hanford et al. | Feb. 18, 1941 |
| 2,735,830 | Coover | Feb. 21, 1956 |

FOREIGN PATENTS

| | | |
|---|---|---|
| 672,427 | Canada | Oct. 15, 1963 |